US008646738B2

(12) United States Patent
Stoob et al.

(10) Patent No.: US 8,646,738 B2
(45) Date of Patent: Feb. 11, 2014

(54) DEVICE FOR ADJUSTING THE HEIGHT OF AN ASSEMBLY WITHOUT THE USE OF TOOLS

(75) Inventors: Melanie Stoob, Hamburg (DE); Benedikt Schmidt-Kortenbusch, Hamburg (DE); Nils Ischdonat, Hamburg (DE); Rolf Bense, Jork (DE)

(73) Assignee: Airbus Operations GmbH, Hamburg (DE)

( * ) Notice: Subject to any disclaimer, the term of this patent is extended or adjusted under 35 U.S.C. 154(b) by 350 days.

(21) Appl. No.: 12/778,687

(22) Filed: May 12, 2010

(65) Prior Publication Data
US 2010/0264269 A1    Oct. 21, 2010

Related U.S. Application Data

(63) Continuation of application No. PCT/EP2008/061070, filed on Aug. 25, 2008.

(60) Provisional application No. 61/004,827, filed on Nov. 30, 2007.

(30) Foreign Application Priority Data

Nov. 30, 2007    (DE) .......................... 10 2007 057 617

(51) Int. Cl.
*B25B 5/08*    (2006.01)
(52) U.S. Cl.
USPC ......... 248/188.4; 269/165; 269/229; 248/420
(58) Field of Classification Search
USPC ............... 269/229, 217, 165; 248/188.4, 419, 248/420, 657
See application file for complete search history.

(56) References Cited

U.S. PATENT DOCUMENTS

| 194,582 A | 8/1877 | Cole |
| 1,557,740 A | 10/1925 | Sullivan |

(Continued)

FOREIGN PATENT DOCUMENTS

| JP | 2006-241930 | 9/2004 |
| RU | 2156185 | 9/2000 |

(Continued)

OTHER PUBLICATIONS

International Search Report and Written Opinion for PCT/EP2008/061070 dated Aug. 25, 2008.
German Office Action for DE 10 2007 057 617.1-12 dated Oct. 31, 2008.
Decision to Grant for Application No. 2010120731/11 dated Jun. 29, 2012.
Japanese Office Action for Application No. 2010-535308 dated Feb. 1, 2013.

*Primary Examiner* — Brent W Herring
(74) *Attorney, Agent, or Firm* — Jenkins, Wilson, Taylor & Hunt, P.A.

(57) ABSTRACT

The invention relates to a device comprising a base plate and a support for adjusting the height of an assembly, in particular of a galley module in an aircraft, without using tools.
According to the invention, two opposing wedge bodies are arranged such that they can be displaced horizontally between the base plate and the support, the oppositely directed manual displacement of the two wedge bodies, when the lock levers have been raised, causes in the "adjusting position" a raising or lowering of the support for the height adjustment. The assembly is connected to the support, for example by a conventional screw connection through the attachment hole in the support.
The device according to the invention allows a user to perform a simple and rapid height adjustment of an assembly arranged thereon, thereby greatly reducing the assembly effort required for prefabricated assemblies or modules in aircraft.

14 Claims, 3 Drawing Sheets

(56) References Cited

U.S. PATENT DOCUMENTS

| | | | | |
|---|---|---|---|---|
| 1,794,798 | A | * | 3/1931 | Sarr ................................ 254/104 |
| 3,750,987 | A | * | 8/1973 | Gobel ............................ 248/694 |
| 4,213,509 | A | | 7/1980 | Hafner |
| 4,269,392 | A | | 5/1981 | Andersen |
| 4,436,268 | A | * | 3/1984 | Schriever .................. 248/188.3 |
| 4,456,206 | A | | 6/1984 | Tijssen |
| 5,427,349 | A | | 6/1995 | Obrecht |
| 5,584,464 | A | * | 12/1996 | Whittaker ..................... 248/678 |
| 6,491,343 | B2 | * | 12/2002 | Yamazaki ................. 297/250.1 |
| 2005/0005544 | A1 | | 1/2005 | Borowiecki |

FOREIGN PATENT DOCUMENTS

| | | |
|---|---|---|
| SU | 720246 | 3/1980 |
| WO | WO0055510 | 9/2000 |
| WO | WO2005095209 | 10/2005 |

* cited by examiner

DEVICE FOR ADJUSTING THE HEIGHT OF AN ASSEMBLY WITHOUT THE USE OF TOOLS

CROSS-REFERENCE TO RELATED APPLICATIONS

This application is a continuation of PCT/EP2008/061070 and claims the benefit of U.S. Provisional Application No. 60/004,827, filed Nov. 30, 2007 and German Patent Application No. 10 2007 057 617.1, filed Nov. 30, 2007, the entire disclosures of which are herein incorporated by reference.

FIELD OF THE INVENTION

The invention relates to a device comprising a base plate and a support for adjusting the height of an assembly, in particular of a galley module in an aircraft, without the use of tools.

Modern passenger aircraft have galleys which are provided in prefabricated form by external outfitters and suppliers. During installation, tolerance compensation generally has to be made between the galley holder and the galley module as a result of unavoidable manufacturing tolerances. The same problem usually arises for other prefabricated modules or assemblies which are to be installed in the fuselage airframe structure.

The necessary tolerance compensation, in particular the height compensation is presently performed using so-called "shim plates", i.e. planar spacers or washers of the same or respectively different thickness. This procedural method is complicated, because many "shim plates" of a different material thickness have to be inserted between the galley holder and the galley and, if necessary, also have to be combined together to adjust the correct desired height. After inserting and positioning one or more "shim plates", the fastening screws of the galley are tightened such that the galley settles in the final correct position. A check is then made to ascertain whether the height adjustment corresponds to the preset values. If this is not the case, the procedure then has to be repeated using another "shim plate" or a combination of "shim plates", and the fastening screws of the galley have to be undone again. Furthermore, this method requires the provision of a comprehensive stock of different compensating discs in the installation region, and for reasons of aircraft safety, the greatest care must also be taken that no parts get lost in the structure during assembly. Finally, assembly without tools using "shim plates" and a continuously variable height adjustment is not possible.

Alternatively, it is possible to perform the height compensation by screwing in vertical tapped bushings. In this case, although a continuously variable height adjustment is possible, but specific tools are required for the adjustment. In order to compensate for a relatively great height difference, it may be necessary to perform a very great number of turns of the tapped bushing.

SUMMARY OF THE INVENTION

The object of the invention is to provide a device for adjusting the height of assemblies in aircraft, which device allows a rapid and substantially continuously variable height adjustment of the assembly, without the use of tools, when said assembly is installed in the fuselage airframe structure of an aircraft without losable parts.

This object is achieved by a device which has the features of claim 1.

Due to the fact that two opposed wedge bodies for height adjustment are arranged such that they are guided displaceably between the base plate and the support and that the wedge bodies can be secured against displacements parallel to a longitudinal axis, a rapid and particularly tool-less or manual height adjustability is provided which can be performed by just one handgrip of the user. Furthermore, the oppositely moving wedge bodies produce an advantageous transmission ratio so that relatively small horizontal movements are transformed into vertical movements which are almost proportional thereto, while on the other hand no excessive actuating forces have to be applied for the height adjustment.

The respectively adjusted horizontal position of the wedge bodies is secured by securing means, thereby ruling out uncontrolled displacements and thus a change in height of the device.

According to an advantageous embodiment, at least regions of an upper side of the substantially rectangular base plate have base plate teeth.

This measure prevents an uncontrolled displacement of the wedge bodies.

According to a further advantageous embodiment of the device, at least regions of an upper side of the base plate have a tongue, in particular a dovetailed tongue which can be introduced into grooves, in particular dovetailed grooves, respectively arranged in the region of lower sides of the wedge bodies, such that each wedge body is guided displaceably parallel to the longitudinal axis of the base plate.

The guidance of the wedge bodies on the base plate by an in particular dovetailed tongue and groove connection provides a low mechanical clearance simultaneously with a high loadability in the vertical direction, still with an easy horizontal displaceability. Furthermore, the wedge bodies cannot be raised from the base plate. Finally, it is possible to work the base plate and both wedge bodies integrally out of a single block of material, for example by conventional cutting methods.

A development provides that a lock lever which can be pivoted manually transversely to the longitudinal axis is accommodated in each wedge body, in which case at least regions of each lock lever have lock lever teeth in the region of a lower side.

The meshing of lock lever teeth and base plate teeth when the lock lever is pressed downwards prevents an uncontrolled horizontal displacement of the wedge bodies and thus a change in the height adjustment without actively raising the lock lever. In addition, the teeth of the base plate and of the lock elements allow an almost continuously variable or very finely graduated height adjustability of the device. During installation of an assembly, to adjust the height the lock levers are raised and the wedge bodies are moved backwards and forwards in opposite directions to one another until the height is adjusted. When the two lock levers are subsequently pressed down, the wedge bodies are secured in their respective position by the meshing of the base plate teeth and of the lock lever teeth.

According to a further advantageous embodiment of the device, the lock levers are each pretensioned by a spring.

Consequently, the lower-side teeth of the lock levers in the unraised, i.e. downwardly pressed state are pressed firmly into the base plate teeth by the effect of the spring force, such that an undesirable adjustment of the wedge body positions is extensively ruled out even under the effect of external forces.

It is possible to increase the power of resistance of the locking effect with respect to the effect of external forces by enlarging the respectively meshing teeth (base plate teeth and lock lever teeth). Examples of springs which can be used include helical springs, flat coil springs, leaf springs, helical springs with two sides of the spring arranged in a v-shape, or the like.

BRIEF DESCRIPTION OF THE DRAWINGS

Further advantageous embodiments of the device are set out in the further claims. In the drawings:

In the drawings, the same constructive elements each have the same reference numeral.

FIG. 1 is a perspective exploded view of an embodiment of the device for adjusting the height of assemblies.

DESCRIPTION OF EXEMPLARY EMBODIMENTS

Figure 1:
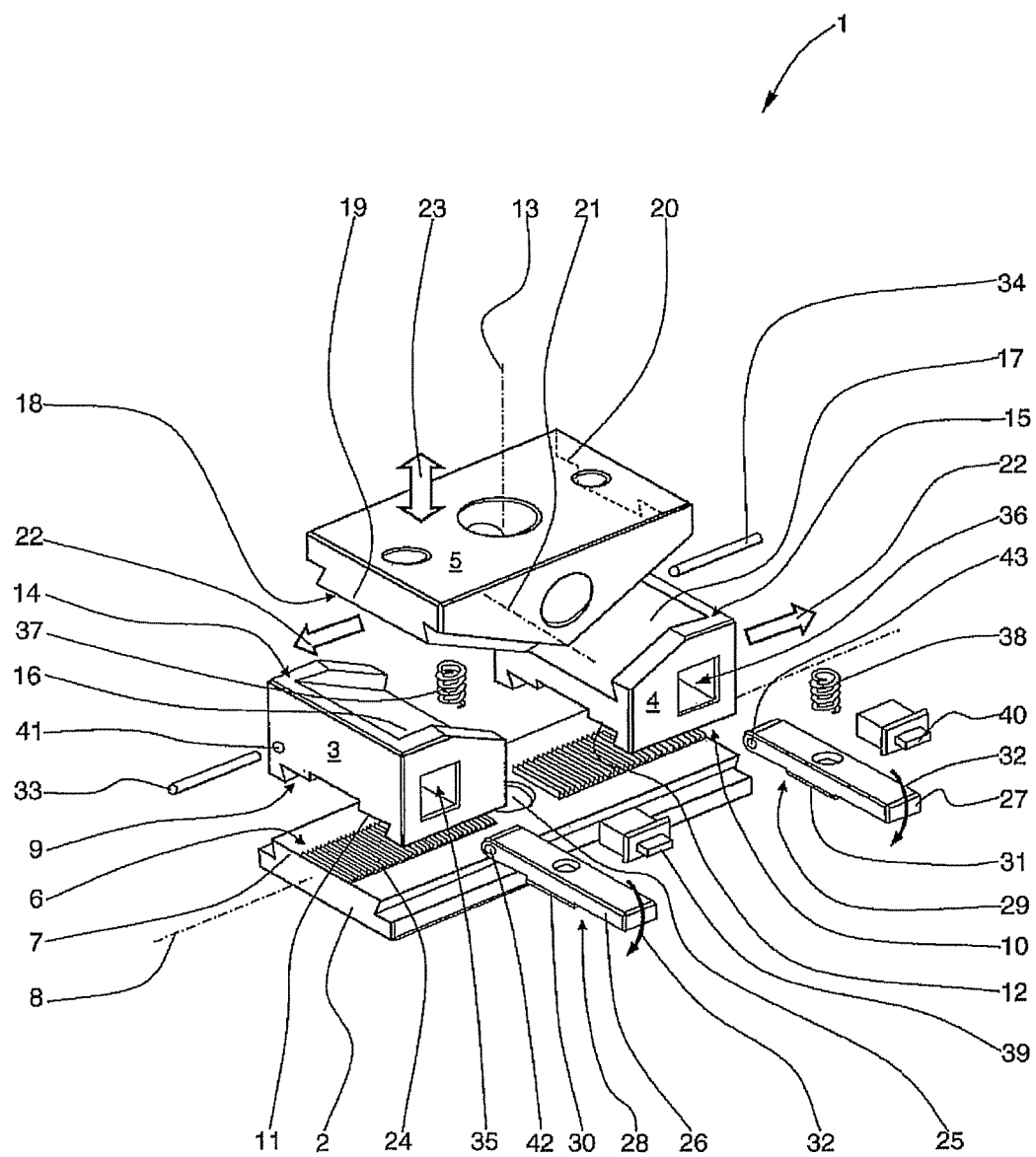
FIG. 1 is a perspective view of the device with all the basic individual components.

A device 1 according to the invention for adjusting the height of assemblies comprises, inter alia, a substantially rectangular base plate 2, two wedge bodies 3, 4 and a support 5. An upper side 6 of the base plate 2 is provided, for example with a preferably dovetailed tongue 7 which runs parallel to a longitudinal axis 8. Each of the two wedge bodies 3, 4 has in the region of a lower side 9, 10 a preferably dovetailed groove 11, 12 which is configured such that it corresponds to the tongue 7. The wedge bodies 3, 4 are each guided displaceably on the tongue 7 of the base plate 2 parallel to the longitudinal axis 8 due to the dovetailed grooves 11, 12. It is impossible to lift the thus guided wedge bodies 3, 4 parallel to a vertical axis 13 and thus a secure and smooth-running guidance of the wedge bodies 3, 4 on the base plate 2 is ensured. Introduced into both upper sides 14, 15 of the wedge bodies 3, 4 is a respective, also preferably dovetailed groove 16, 17. According to the invention, the grooves 16, 17 are configured to be inclined in each case by an angle of between 10° and 40° in relation to the longitudinal axis 8, the grooves 16, 17 in both wedge bodies 3, 4 being respectively inclined in opposite directions, i.e. the wedge bodies 3, 4 are configured to be mutually mirror-symmetrical.

A lower side 18 of the support 5 also has two preferably dovetailed tongues 19, 20 which are configured corresponding to the dovetailed grooves 16, 17 in the wedge bodies 3, 4 and can be introduced positively into said grooves 16, 17 at least in regions. The tongues 19, 20 which run at an inclination angle in a range of from 10° and 40° are inclined in opposite directions such that the tongues 19, 20 meet in the region of a centre line 21 of the support 5. The geometric shape of the support 5 approximately corresponds to that of an inverted v-shaped roof. The inclination angles of the tongues 19, 20 of the support 5 correspond in each case to inclination angles of the grooves 16, 17 in the wedge bodies 3, 4. By simultaneously moving both wedge bodies 3, 4 in the direction of or against the orientation of the arrows 22, in conjunction with the inclined grooves 16, 17 or the tongues 19, 20 the opposed horizontal movement of the wedge bodies 3, 4 is transformed into a vertical movement of the support 5 in the direction of the arrow 23 to adjust the height of an assembly (not shown) attached to the support 5, for example a galley module or the like. The base plate 2 is connected, for example to a floor frame (not shown) of a fuselage airframe structure of an aircraft or to a galley support.

As an alternative to guiding the wedge bodies 3, 4 between the base plate 2 and the support 5 by a dovetail guidance, it is possible to use any suitable alternative linear guidance, for example a longitudinal guidance using rods and slide bushes guided thereon, linear ball bearings or the like. However, the dovetail guidance which is merely shown by way of example has the important advantage that it can be realised with a minimum of parts, since both the wedge bodies 3, 4 and the base plate 2 and the support 5 can be cut integrally out of a solid material, for example a suitably-sized block of a readily CNC-workable aluminium alloy.

In order to secure the wedge bodies 3, 4 against uncontrolled displacements parallel to the longitudinal axis 8, at least regions of the base plate 2 have base plate teeth 24. The base plate teeth 24 extend over the entire length expanse of the base plate 2 on both sides of the longitudinal axis 8, only one region being left clear for an attachment hole 25 in the base plate 2. Furthermore, two lock levers 26, 27 are present which can be pivoted upwards and downwards and are provided with lock lever teeth 30, 31 in the region of a lower side 28, 29. The lock lever teeth 30, 31 are brought into engagement with the base plate teeth 24 when the lock levers 26, 27 are pressed downwards in the direction of the arrows 32 by a user. The two lock levers 26, 27 are accommodated or mounted pivotally by the pins 33, 34 in the recesses 35, 36 inside the wedge bodies 3, 4. To ensure that the lock lever teeth 30, 31 are always engaged in a "securing position" with the base plate teeth 24 for securing the wedge bodies 3, 4, the two lock levers 26, 27 are preferably pretensioned in each case by a (pressure) cylinder spring 37, 38 or a (pressure) helical spring. Alternatively, with a suitable constructive connection of the lock levers 26, 27 in the wedge bodies 3, 4, it is possible to use flat coil springs, leaf springs, helical springs with two sides of the spring arranged in a v-shape, in each case in a compression or traction configuration. A substantially square cross-sectional surface, which is not described in more detail, of the recesses 35, 36 is dimensioned such that the lock levers 26, 27 can be pivoted upwards, against the direction of the arrow 32, by a user until the lock lever teeth 30, 31 no longer mesh with the base plate teeth 24, but have been lifted out of said base plate teeth 24. In this so-called "adjusting position", the wedge bodies 3, 4 can be moved manually, without using a tool, parallel to the longitudinal axis 8 to adjust the height of the support 5. When the two wedge bodies 3, 4 are moved outwards, the support 5 is lowered, whereas when the wedge bodies 3, 4 are moved inwards, the support 5 is raised parallel to the vertical axis 13.

When the support 5 has reached the intended height, the user simply releases the lock levers 26, 27. Consequently, the lock levers 26, 27 automatically pivot back into their "securing position" in the direction of arrows 32 by the effect of the cylindrical springs 37, 38, in which position the two sets of lock lever teeth 30, 31 mesh positively at least in regions with the base plate teeth 24 and any horizontal displacements of the two wedge bodies 3, 4 are ruled out.

Both the base plate teeth 24 and the lock lever teeth 30, 31 are formed by a sufficiently fine, preferably prismatic tooth system with a large number of small teeth which, in the relevant height compensation region of the device 1, allow a practically almost continuously variable height adjustment with a simultaneous secure locking of the wedge bodies 3, 4. The teeth of the base plate teeth 24 and of the lock lever teeth 30, 31 which have not been provided with a reference numeral have in each case an approximately triangular cross-sectional geometry with a height Of for example up to 1 mm and a width of the base side of up to 2 mm (cross-sectional geometry in the form of an equilateral triangle), the longitudinal axes of the teeth in each case running transversely to the longitudinal axis 8. Other geometric configurations of the tooth geometry are also possible.

Finally, in the lowered state of the lock levers 26, 27, two stoppers 39, 40 as an additional securing means are pressed into the recesses 35, 36 with a light pressing closure above the two lock levers 26, 27, thereby making it impossible for the lock levers 26, 27 to pivot upwards and thus preventing any uncontrolled height adjustment of the device 1. Furthermore, the stoppers 39, 40 ensure protection against the penetration of moisture and particles of grime into the device 1 and thus ensure that the device 1 can be easily operated at any time.

The lock levers 26, 27 are mounted pivotally on two pins 33, 34, which are each mounted in a hole inside the wedge bodies 3, 4. Of the two holes, only one hole 41 in the first front wedge body 3 has a reference numeral representing the concealed hole in the second rear wedge body 4. In the region of their trailing ends, the lock levers 26, 27 each have a continuous hole 42, 43 for the guidance through of the pins 33, 34.

Figure 2:
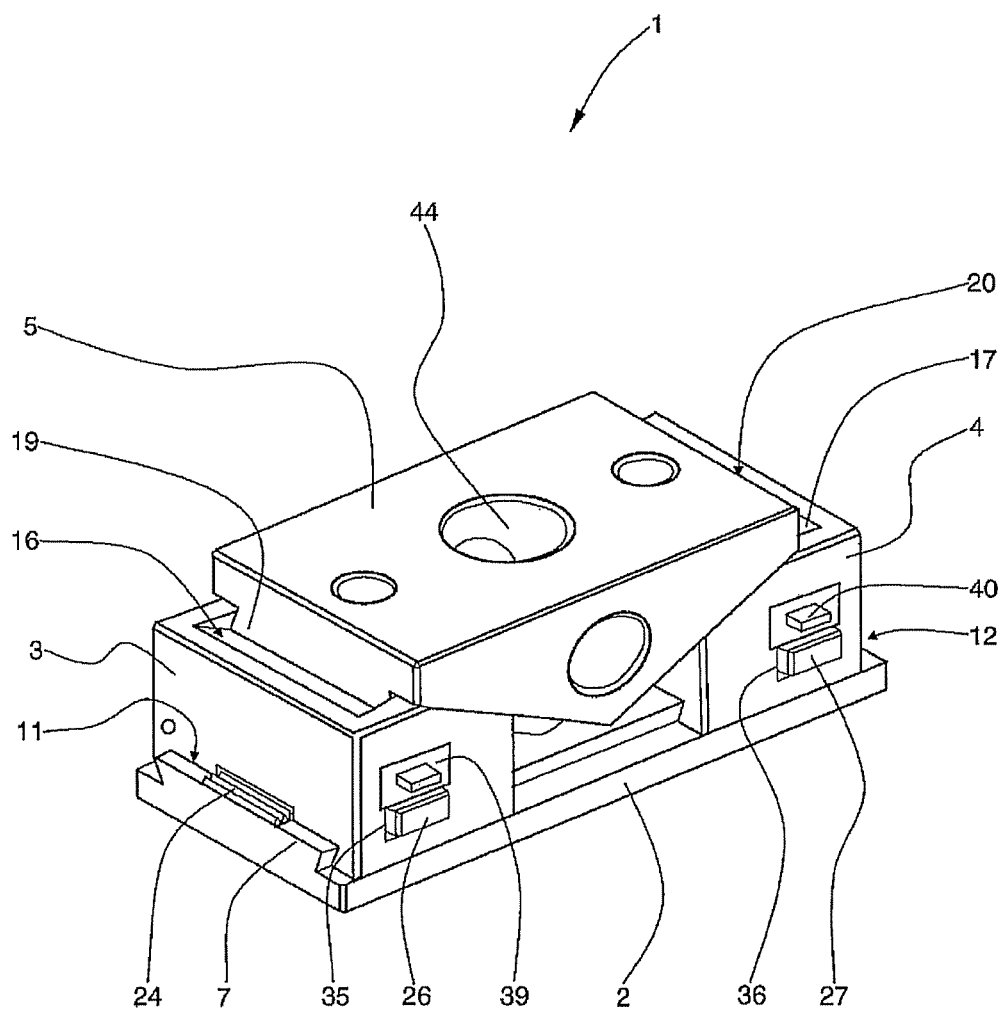
FIG. 2 is a perspective view of the mounted device.

FIG. 2 is a perspective view of the device in the assembled state.

The wedge bodies 3, 4 of the device 1 with their lower-side dovetailed grooves 11, 12 are guided on the tongue 7 with the teeth 24 of the base plate 2, while the support 5 with its two lower-side tongues 19, 20 is accommodated displaceably in the upper-side grooves 16, 17 in the two wedge bodies 3, 4. In the view of FIG. 2, the lock levers 26, 27 are in the "securing position" in which the stoppers 39, 40 have been pressed or inserted into the recesses 35, 36 and there is no possibility of a horizontal displacement of the wedge bodies 3, 4. Due to the easy press fit between the stoppers 39, 40 and the recesses 35, 36, the stoppers 39, 40 are themselves secured against falling out. The stoppers 39, 40 can also be captively connected, for example to the base plate 2 or the wedge bodies 3, 4 by securing tapes (not shown). Introduced into the support 5 is at least one preferably centrally arranged central attachment hole 44 which serves to connect the assembly (not shown) or function modules which are to be attached, for example in the form of a galley module or the like, the height adjustment of which is to be varied in a continuously variable manner by the device 1.

Figure 3:
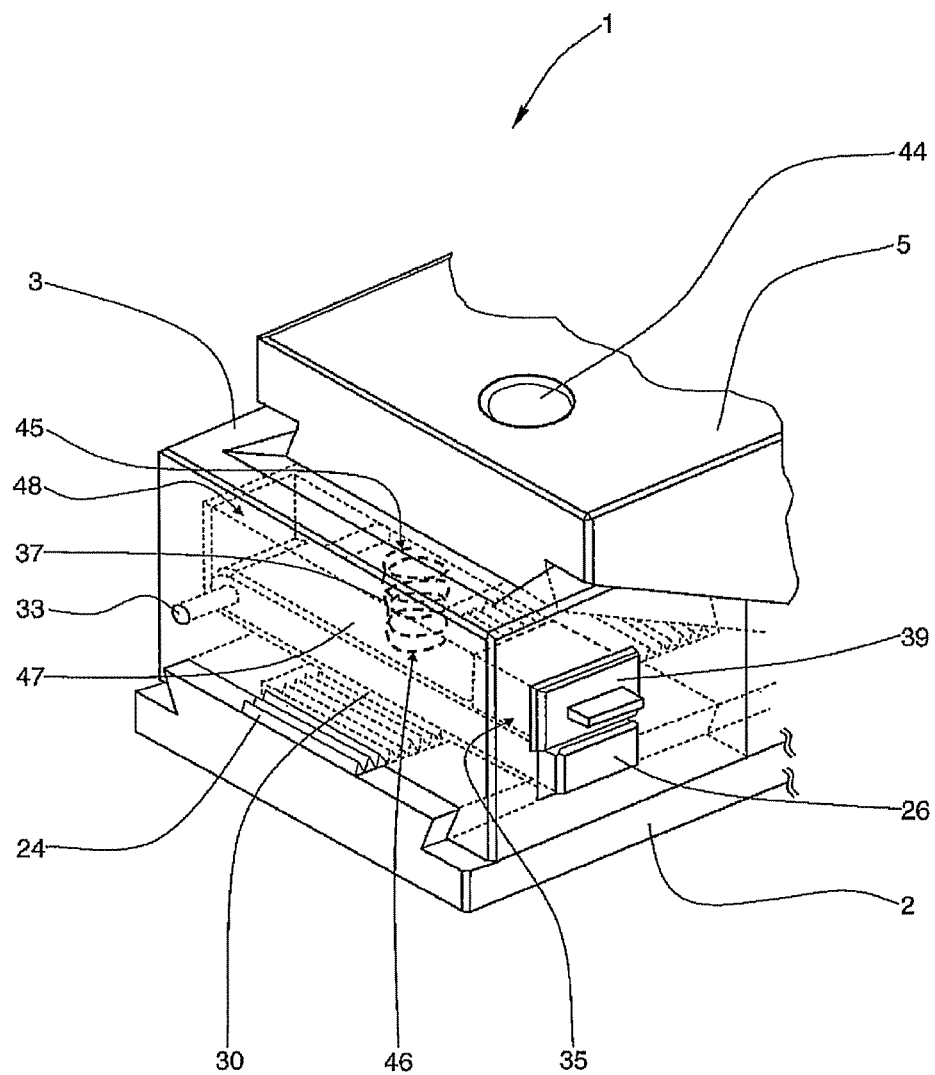
FIG. 3 is a perspective internal view of part of the device.

FIG. 3 is a perspective (partially internal) view of the left-side wedge body 3 of the device in the assembled state, to which the inner structure of the wedge body 4 corresponds which is constructed in a mirror-inverted manner to wedge body 3. On the base plate 2, the left-side wedge body 3 is accommodated in a known manner in the dovetailed guide means such that it can be displaced horizontally.

The lock lever 26 is pressed downwards under the effect of the cylindrical spring 37 and is held in this position ("securing position") such that the base plate teeth 24 mesh with the lock lever teeth 30 and there is no possibility of horizontal displacements of the wedge body 3. Thus, an uncontrolled, automatic raising or lowering of the support 5 is impossible.

To adjust the height of the support 5, a user removes the stoppers 39, 40, raises both lock levers 26, 27 manually without tools until the "adjusting position" is reached, introduces the stoppers 39, 40 under the lock levers 26, 27 into the recesses 35, 36, as a result of which they are held without further support in the raised position, and moves the wedge bodies 3, 4 in opposite directions on the base plate 2 until the correct height adjustment of the device 1 has been found. Due to the lock levers 26, 27 which are held in the raised position by the stoppers 39, 40, the user keeps both hands free for the height adjustment during assembly. When the intended height adjustment has been found, the two lock levers 26, 27 automatically return into the "securing position" after the user has removed, by pulling out, the stoppers 39, 40 from the recesses 35, 36. Finally, by pressing the stoppers 39, 40 above the lock levers 26, 27 into the recesses 35, 36, lock levers 26, 27 can be fixed in the "securing position". In addition, the stoppers 39, 40 prevent the development of rattling noises in the event of oscillations or vibrations.

Both ends of the cylindrical springs 37 are accommodated in respectively opposite holes 45, 46 of a small depth which are respectively introduced into a central region of an upper side 47 of the lock lever 26 and in the region of a cover surface 48 of the recess 35 in the wedge body 3 and are thus secured against sliding laterally. The lock lever 26 is mounted pivotally inside the first wedge body 3 by the pin 33. Any upwards movement of the lock lever 26 is blocked by the stopper 39 inserted into the recess 35 in the "securing position" illustrated in FIG. 3. The fixing in position of the cylindrical spring 38 in the lock lever 27 and in the recess 36 (and the mounting thereof in the right-hand wedge body 4, not shown in FIG. 3) is carried out analogously (cf. in particular FIG. 1).

Due to the device 1 according to the invention, it is no longer necessary for the height adjustment procedure to release the (screw) connection between the support 5 and an assembly (not shown) which is attached thereon, for example a galley module, during the adjusting procedure and to then screw it down again. The same applies to the attachment of the base plate 2 to a substructure (not shown), for example to a galley support arranged on a floor frame of a fuselage airframe structure, so that by using the device 1, it is possible to considerably reduce the assembly effort.

| LIST OF REFERENCE NUMERALS | |
| --- | --- |
| 1 | device |
| 2 | base plate |
| 3 | wedge body (first) |
| 4 | wedge body (second) |
| 5 | support |
| 6 | upper side (base plate) |
| 7 | tongue (base plate) |
| 8 | longitudinal axis |
| 9 | lower side (first wedge body) |
| 10 | lower side (second wedge body) |
| 11 | groove (lower side of first wedge body) |
| 12 | groove (lower side of second wedge body) |
| 13 | vertical axis |
| 14 | upper side (first wedge body) |
| 15 | upper side (second wedge body) |
| 16 | groove (upper side of first wedge body) |
| 17 | groove (upper side of second wedge body) |
| 18 | lower side (support) |
| 19 | spring ⎫ support |
| 20 | spring ⎭ |
| 21 | centre line (crown line of support) |
| 22 | arrow |
| 23 | arrow |
| 24 | base plate teeth |
| 25 | attachment hole (base plate) |
| 26 | lock lever (first wedge body) |
| 27 | lock lever (second wedge body) |
| 28 | lower side (lock lever) |
| 29 | lower side (lock lever) |
| 30 | lock lever teeth |
| 31 | lock lever teeth |
| 32 | arrow |
| 33 | pin |
| 34 | pin |
| 35 | recess (first wedge body) |
| 36 | recess (second wedge body) |
| 37 | cylindrical spring |
| 38 | cylindrical spring |
| 39 | stopper |

-continued

LIST OF REFERENCE NUMERALS

| | |
|---|---|
| 40 | stopper |
| 41 | hole (first wedge body) |
| 42 | hole ⎫ lock lever |
| 43 | hole ⎭ |
| 44 | attachment hole (support) |
| 45 | hole (position fixing for cylindrical spring) |
| 46 | hole (position fixing for cylindrical spring) |
| 47 | upper side (first lock lever) |
| 48 | cover surface (first recess) |

The invention claimed is:

1. A device comprising a base plate and a support for manually adjusting the height of an assembly characterised in that two opposing wedge bodies are arranged such that they can be guided displaceably for the height adjustment between the base plate and the support and the wedge bodies can be secured against displacements parallel to a longitudinal axis of the base plate and at least regions of an upper side of the substantially rectangular base plate have base plate teeth to secure the wedge bodies, wherein the device further comprises a lock lever which can be manually pivoted transversely to the longitudinal axis, wherein the lock lever is accommodated in each wedge body, at least regions of each lock lever having teeth in the region of a lower side, which teeth can be brought into meshing engagement with the base plate teeth by pivoting downwards, for securing the respective position of the wedge bodies, and wherein at least regions of the upper side of the base plate have a tongue which can be introduced into grooves arranged respectively in the region of lower sides of the wedge bodies such that each wedge body is guided displaceably parallel to the longitudinal axis of the base plate.

2. The device according to claim 1, wherein each lock lever is pretensioned in each case by a spring to keep the respective lock lever teeth in meshing engagement with the base plate teeth and thus to secure the position of the wedge bodies on the base plate.

3. The device according to claim 2, wherein each lock lever is pretensioned in each case by a cylindrical spring.

4. The device according to claim 1, wherein each lock lever is secured by a securing means against pivoting upwards unintentionally and against the penetration of grime particles.

5. The device according to claim 4, wherein each lock lever is secured by a stopper.

6. The device according to claim 1, wherein the lock levers are each pivotally accommodated in a recess running transversely to the longitudinal axis in the associated wedge body, into which recess the securing means can be inserted when the lock lever is pivoted downwards.

7. The device according to claim 1, wherein a lower side of the support has two tongues which are inclined in opposite directions with respect to one another and which adjoin one another in the region of a centre line.

8. The device according to claim 7, wherein a respective inclined groove is introduced into each upper side of a wedge body, said grooves being inclined in opposite directions and the inclination of the grooves corresponding to a respective inclination of the tongues of the support.

9. The device according to claim 8, wherein a dovetailed groove is introduced into each upper side of a wedge body.

10. The device according to claim 7, wherein a lower side of the support has two dovetailed tongues.

11. The device according to claim 1, wherein opposing displacements of the wedge bodies parallel to the longitudinal axis result in a raising or lowering of the support parallel to a vertical axis.

12. The device according to claim 1, wherein the assembly can be connected to the support.

13. The device according to claim 1, wherein the assembly is a galley module in an aircraft.

14. The device according to claim 1, wherein at least regions of the upper side of the base plate have a dovetailed tongue which can be introduced into dovetailed grooves.

\* \* \* \* \*